US012685325B1

(12) United States Patent
Pascua Cubides

(10) Patent No.: US 12,685,325 B1
(45) Date of Patent: Jul. 21, 2026

(54) BINDERS AND METHODS OF MAKING AND USING THE SAME

(71) Applicant: THE HERSHEY COMPANY, Hershey, PA (US)

(72) Inventor: Yvette Thibault Pascua Cubides, Palmyra, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 196 days.

(21) Appl. No.: 17/396,178

(22) Filed: Aug. 6, 2021

Related U.S. Application Data

(62) Division of application No. 16/111,714, filed on Aug. 24, 2018, now Pat. No. 11,102,998.

(Continued)

(51) Int. Cl.
A23L 7/126      (2016.01)
A23J 1/00       (2006.01)
A23J 1/14       (2006.01)

(52) U.S. Cl.
CPC ............... *A23L 7/126* (2016.08); *A23J 1/006* (2013.01); *A23J 1/14* (2013.01); *A23V 2002/00* (2013.01);

(Continued)

(58) Field of Classification Search
CPC .. A23L 7/126; A23J 1/006; A23J 1/14; A23V 2300/10; A23V 2002/00; A23V 2250/6406; A23V 2250/548; A23V 2200/21
See application file for complete search history.

(56) References Cited

U.S. PATENT DOCUMENTS 4,000,323 A    12/1976  Youngquist
4,052,517 A    10/1977  Youngquist
                        (Continued)

FOREIGN PATENT DOCUMENTS

CA       1103981 A    6/1981
CA       1189739 A    7/1985
                      (Continued)

OTHER PUBLICATIONS

Kuntz, "Protein Possibilities". Available online at https://www. naturalproductsinsider.com/ingredients/protein-possibilities. (Year: 1997).*

(Continued)

*Primary Examiner* — Erik Kashnikow
*Assistant Examiner* — Assaf Zilbering
(74) *Attorney, Agent, or Firm* — McNees Wallace & Nurick LLC

(57)                    ABSTRACT

A comestible binder includes water, glycerol, and about 25% by weight or greater of a protein source including a protein. A comestible product includes inclusions and the binder holding the inclusions together in the comestible product. A method of forming a binder includes combining water, glycerol, and about 10% by weight or greater of the protein source to form a binder composition. The method also includes removing water at a dehydrating temperature less than a denaturation temperature of the protein to achieve the binder having a predetermined moisture level without denaturing the protein. The binder includes about 25% by weight or greater of the protein source and the protein is not in a denatured state in the binder. The protein source may include a pulse protein, a lentil protein, a chickpea protein, a potato protein, a rapeseed protein, a sunflower protein, an algae protein, or a combination thereof.

17 Claims, 3 Drawing Sheets

Related U.S. Application Data

(60) Provisional application No. 62/643,930, filed on Mar. 16, 2018, provisional application No. 62/550,057, filed on Aug. 25, 2017.

(52) U.S. Cl.
CPC ..... *A23V 2200/21* (2013.01); *A23V 2250/548* (2013.01); *A23V 2250/6406* (2013.01); *A23V 2300/10* (2013.01)

(56) References Cited

U.S. PATENT DOCUMENTS

| | | | |
|---|---|---|---|
| 4,055,669 A | 10/1977 | Kelly et al. | |
| 4,169,090 A | 9/1979 | Murray et al. | |
| 4,250,198 A | 2/1981 | Millar et al. | |
| 4,259,358 A | 3/1981 | Duthie | |
| 4,474,694 A | 10/1984 | Coco et al. | |
| 4,677,065 A | 6/1987 | Buchbjerg et al. | |
| 4,734,287 A | 3/1988 | Singer et al. | |
| 5,358,727 A | 10/1994 | Yates et al. | |
| 5,554,406 A | 9/1996 | Muenz et al. | |
| 5,711,975 A | 1/1998 | Gonze et al. | |
| 5,747,088 A | 5/1998 | Fletcher | |
| 5,853,778 A | 12/1998 | Mayfield | |
| 5,871,801 A | 2/1999 | Kazemzadeh | |
| 5,897,896 A | 4/1999 | Thomas | |
| 6,113,968 A | 9/2000 | McGuire et al. | |
| 6,174,559 B1 | 1/2001 | Shulman et al. | |
| 6,485,771 B1 | 11/2002 | Somerville et al. | |
| 6,610,347 B1 | 8/2003 | Onwulata | |
| 6,777,016 B2 | 8/2004 | Thresher | |
| 7,419,695 B1 | 9/2008 | Tailie et al. | |
| 8,551,544 B2 | 10/2013 | Borders et al. | |
| 10,058,109 B2 | 8/2018 | Diekhaus | |
| 2002/0037343 A1 | 3/2002 | Terazaki et al. | |
| 2002/0037346 A1 | 3/2002 | Mesu et al. | |
| 2002/0039608 A1 | 4/2002 | Sirohi et al. | |
| 2002/0127319 A1 | 9/2002 | Gare | |
| 2002/0164402 A1 | 11/2002 | Kazemzadeh | |
| 2002/0187302 A1 | 12/2002 | Koslow | |
| 2002/0197357 A1 | 12/2002 | Pfeiffer | |
| 2003/0003194 A1 | 1/2003 | Roussel et al. | |
| 2003/0024641 A1 | 2/2003 | Rogols et al. | |
| 2003/0026826 A1 | 2/2003 | Cherukuri et al. | |
| 2003/0091698 A1 | 5/2003 | Marsland | |
| 2003/0170370 A1 | 9/2003 | Evenson et al. | |
| 2003/0224090 A1 | 12/2003 | Pearce et al. | |
| 2004/0028780 A1 | 2/2004 | Maser et al. | |
| 2004/0109922 A1 | 6/2004 | Thai et al. | |
| 2004/0151800 A1 | 8/2004 | Bachand et al. | |
| 2004/0175481 A1 | 9/2004 | Marchal et al. | |
| 2005/0095321 A1 | 5/2005 | Heywood et al. | |
| 2005/0129817 A1 | 6/2005 | Malecha et al. | |
| 2005/0147717 A1 | 7/2005 | Peremans | |
| 2005/0175602 A1 | 8/2005 | Cook et al. | |
| 2005/0202135 A1 | 9/2005 | Kaneko et al. | |
| 2005/0208189 A1 | 9/2005 | Kurschner et al. | |
| 2006/0008576 A1 | 1/2006 | Buck et al. | |
| 2006/0088628 A1 | 4/2006 | Dekker et al. | |
| 2006/0233940 A1 | 10/2006 | Huzinec et al. | |
| 2006/0286219 A1 | 12/2006 | Mauldin et al. | |
| 2007/0014914 A1 | 1/2007 | Borders et al. | |
| 2007/0020373 A1 | 1/2007 | Maury | |
| 2007/0027283 A1 | 2/2007 | Swift et al. | |
| 2007/0065557 A1 | 3/2007 | Pandey et al. | |
| 2007/0087084 A1 | 4/2007 | Coleman et al. | |
| 2007/0116837 A1 | 5/2007 | Prakash et al. | |
| 2007/0190210 A1 | 8/2007 | Koenig et al. | |
| 2007/0190213 A1 | 8/2007 | Harden et al. | |
| 2007/0231450 A1 | 10/2007 | Coleman et al. | |
| 2007/0237860 A1 | 10/2007 | Abu-Ali et al. | |
| 2007/0269580 A1 | 11/2007 | Werstak | |
| 2008/0020100 A1 | 1/2008 | Madsen et al. | |
| 2008/0026106 A1 | 1/2008 | Weiss et al. | |
| 2008/0102182 A1 | 5/2008 | McCall et al. | |
| 2008/0206406 A1 | 8/2008 | De Jongh et al. | |
| 2008/0226853 A1 | 9/2008 | Bueker et al. | |
| 2008/0280024 A1 | 11/2008 | Harle et al. | |
| 2009/0017168 A1 | 1/2009 | Treece et al. | |
| 2009/0104333 A1 | 4/2009 | Lykomitros et al. | |
| 2009/0110771 A1 | 4/2009 | Kwon | |
| 2010/0003394 A1 | 1/2010 | Giuseppin et al. | |
| 2010/0028497 A1 | 2/2010 | Erraji et al. | |
| 2010/0098829 A1 | 4/2010 | Anand et al. | |
| 2010/0136195 A1 | 6/2010 | Coleman | |
| 2010/0143569 A1 | 6/2010 | Mesu | |
| 2010/0221396 A1 | 9/2010 | Rogers | |
| 2010/0233346 A1 | 9/2010 | Redl et al. | |
| 2010/0278981 A1 | 11/2010 | Ervin | |
| 2011/0014343 A1 | 1/2011 | Jordan | |
| 2011/0039004 A1 | 2/2011 | Garter | |
| 2011/0061645 A1 | 3/2011 | Fosdick et al. | |
| 2011/0086145 A1 | 4/2011 | Rodriguez Campisto et al. | |
| 2011/0104356 A1 | 5/2011 | Coleman et al. | |
| 2011/0189479 A1 | 8/2011 | Zhang et al. | |
| 2011/0274797 A1 | 11/2011 | Segall et al. | |
| 2011/0300262 A1 | 12/2011 | Carella et al. | |
| 2011/0313055 A1 | 12/2011 | Ervin et al. | |
| 2012/0003360 A1 | 1/2012 | Barrett et al. | |
| 2012/0034366 A1 | 2/2012 | Hoffman et al. | |
| 2012/0058701 A1* | 3/2012 | Zhang | C08L 101/00 442/401 |
| 2012/0133073 A1 | 5/2012 | Pacorel et al. | |
| 2012/0269939 A1 | 10/2012 | Hahn et al. | |
| 2012/0294986 A1 | 11/2012 | Choromanski et al. | |
| 2013/0065012 A1 | 3/2013 | Parker et al. | |
| 2013/0174758 A1 | 7/2013 | Mueller | |
| 2013/0243925 A1 | 9/2013 | van Lengerich et al. | |
| 2013/0260008 A1 | 10/2013 | Bialek et al. | |
| 2014/0079847 A1 | 3/2014 | Schaller et al. | |
| 2014/0093626 A1 | 4/2014 | Segall et al. | |
| 2014/0134497 A1 | 5/2014 | Lester et al. | |
| 2014/0154364 A1 | 6/2014 | Cotton et al. | |
| 2014/0212453 A1 | 7/2014 | Chang | |
| 2014/0350142 A1 | 11/2014 | Hansen et al. | |
| 2014/0356510 A1 | 12/2014 | Schweizer et al. | |
| 2015/0044483 A1 | 2/2015 | Parker et al. | |
| 2015/0223498 A1 | 8/2015 | Gu et al. | |
| 2015/0267095 A1* | 9/2015 | Parker | D21H 17/15 523/122 |
| 2015/0366249 A1 | 12/2015 | Lock et al. | |
| 2016/0050956 A1 | 2/2016 | Segall et al. | |
| 2016/0220502 A1 | 8/2016 | Livney | |
| 2016/0295897 A1 | 10/2016 | Lis et al. | |
| 2017/0027876 A1 | 2/2017 | Caillard | |
| 2017/0071229 A1 | 3/2017 | Bernett | |
| 2018/0064130 A1 | 3/2018 | Mann et al. | |
| 2020/0077674 A1 | 3/2020 | Dolmer | |
| 2020/0404941 A1 | 12/2020 | Nieto | |

FOREIGN PATENT DOCUMENTS

| | | | | |
|---|---|---|---|---|
| CA | 2155042 A1 | 2/1996 | | |
| CN | 1118221 A | 3/1996 | | |
| CN | 104366375 A | 2/2005 | | |
| CN | 101518302 A | 9/2009 | | |
| CN | 101589806 A | 12/2009 | | |
| CN | 101744192 A | 6/2010 | | |
| CN | 103355469 A | 10/2013 | | |
| CN | 109793088 A | 5/2019 | | |
| EP | 0713651 A1 | 5/1996 | | |
| EP | 0910961 A1 | 4/1999 | | |
| EP | 0997078 A2 | 5/2000 | | |
| EP | 1604574 A1 | 12/2005 | | |
| EP | 2201846 A1 * | 6/2010 | ............ | A23L 1/053 |
| EP | 2420144 A1 | 2/2012 | | |
| IE | 870753 L | 3/1987 | | |
| JP | 6248340 A | 3/1987 | | |
| JP | 11225707 A | 8/1999 | | |
| JP | 2001309745 A | 11/2001 | | |
| JP | 2006187299 A | 7/2006 | | |
| JP | 2009011312 A | 1/2009 | | |
| JP | 2009017785 A | 1/2009 | | |

(56)        References Cited

FOREIGN PATENT DOCUMENTS

| JP | 2009284885 | A | 12/2009 |
|----|-----------|---|---------|
| KR | 20030018443 | A | 3/2003 |
| KR | 20050115359 | A | 12/2005 |
| PE | 08162001 | A | 8/2001 |
| RU | 2438363 | C1 | 1/2012 |
| RU | 2556382 | C1 | 7/2015 |
| WO | 8301729 | A1 | 5/1983 |
| WO | 9423588 | A1 | 1/1994 |
| WO | 9902043 | A1 | 1/1999 |
| WO | 9951106 | A1 | 10/1999 |
| WO | 0164051 | A2 | 9/2001 |
| WO | 2008101695 | A1 | 8/2008 |
| WO | 2009072315 | A1 | 6/2009 |
| WO | 2009152579 | A1 | 12/2009 |
| WO | 2014064591 | A1 | 5/2014 |
| WO | 2014087422 | A1 | 6/2014 |
| WO | 2014108105 | A1 | 7/2014 |
| WO | 2014118265 | A1 | 8/2014 |
| WO | 2017021084 | A1 | 7/2015 |
| WO | 2015130163 | A1 | 9/2015 |
| WO | 2016009364 | A1 | 1/2016 |
| WO | 2022221727 | A1 | 10/2022 |

OTHER PUBLICATIONS

Zayas, J.F., "Solubility of Proteins". From "Functionality of Proteins in Food". (Year: 1997).*

Santos et al., "Relationship of rheological and microstructural properties with physical stability of potato protein-based emulsions stabilized by guar gum", Food Hydrocolloids, vol. 44 (2015) pp. 109-114.

Khan et al., "Effects of high hydrostatic pressure on emulsifying properties of sweet potato protein in model protein-hydrocolloids system", Food Chemistry, vol. 169 (2015) pp. 448-454.

Khan et al., "The effects of pH and high hydrostatic pressure on the physicochemical properties of a sweet potato protein emulsion", Food Hydrocolloids, vol. 35 (2014) pp. 209-216.

Cheng et al., "Antioxidant and emulsifying properties of potato protein hydrolysate in soybean oil-in-water emulsions", Food Chemistry, vol. 120 (2010) pp. 101-108.

Holm et al., "Emulsifying properties of undenatured potato protein concentrate", J. Fd. Technol., vol. 15 (1980) pp. 71-83.

Khan et al., "Effects of high hydrostatic pressure on the physicochemical and emulsifying properties of sweet potato protein", International Journal of Food Science and Technology, vol. 48, (2013) pp. 1260-1268.

Romero et al., "Interfacial and Oil/Water Emulsions Characterization of Potato Protein Isolates", J. Agric. Food Chem., vol. 59, (2011) pp. 9466-9474.

Calero et al., "Effect of pH on o/w emulsions formulated with potato protein and chitosan", Grasas y Aceites, vol. 64, (2013) pp. 15-21.

Zayas, "Solubility of Proteins" in "Functionality of Proteins in Food", pp. 6-75, Berlin: Springer-Verlag (1997).

Hartel et al., "Chapter 10: Caramel, Fudge and Toffee", pp. 273-299 in Confectionery Science and Technology,Springer International Publishing (2017).

* cited by examiner

BINDERS AND METHODS OF MAKING AND USING THE SAME

CROSS-REFERENCE TO RELATED APPLICATIONS

This application is a divisional of U.S. patent application Ser. No. 16/111,714 filed Aug. 24, 2018, which claims priority to and the benefit of U.S. Provisional Application No. 62/550,057 filed Aug. 25, 2017 and U.S. Provisional Application No. 62/643,930 filed Mar. 16, 2018, both of which are hereby incorporated by reference in their entirety.

FIELD OF THE INVENTION

This application is directed to binders and methods of making and using the same. More particularly, the present application is directed to a comestible binder with reduced simple sugar content and increased protein content and methods of making and using the comestible binder.

BACKGROUND OF THE INVENTION

Inclusions of comestibles, such as granola bars, cereal bars, and clusters, are conventionally bound together by a sugar-based syrup binder including a sugar-based syrup, such as, for example, honey, agave, maple syrup, or corn syrup. These sugar-based syrup binder systems provide a final texture that may range from crispy to chewy depending on its moisture content and mechanical properties. A binder should maintain a water activity that is compatible with the agglomerated particles to maintain their desired crispiness. Simple sugars are humectants that are superior in their ability to reduce water activity levels while maintaining flexibility of the matrix.

Nutritionally, it is not always desirable to consume relatively high levels of simple sugars. Efforts to reduce the simple sugar content of such binders have included replacing a portion of the simple sugars with a longer chain carbohydrate or a protein, such as a soy, egg, or wheat protein. For example, a modified wheat protein isolate binder system has a pliable, chewy texture after drying. The ability of these proteins to function in a binder for various inclusions may be due, at least in part, to the ability of the protein or modified protein to form a flexible and elastic network. In another example, a binder includes 0.5 to 9 wt % whey protein. In another example, a binder for a cereal bar includes at least 15 wt % protein that is preferably a dairy protein, 33 to 85 wt % fat, and up to 52 wt % simple sugars.

Given the increase in concern regarding allergens in recent years, it may be beneficial to avoid common allergens in selecting protein sources for reducing the amount of simple sugar in binders, but such protein sources have had only limited recent usage. Commonly allergenic protein sources include celery root, stalk, and leaves; crustaceans, including shrimp and lobster; eggs; gluten from rye, wheat, barley, or oats; fish; lupine; milk; mollusks, including clams, mussels, and scallops; mustard; soy; sesame seeds; peanuts; wheat; tree nuts, including almonds, brazil nuts, cashews, coconut, hazelnuts, macadamias, pecans, pine nuts, pistachios, shea nuts, and walnuts; and other nuts, including beech nuts, chinquapin, ginkgo nuts, hickory nuts, lychee nuts, and pili nuts.

Certain pulses are generally not considered to be common allergenic protein sources. Pulses are typically consumed whole, either dried and utilized in soups or canned and used in salads. Isolated or concentrated pulse proteins are beginning to emerge more into the market, however, with their additional uses mainly being in protein doughs or breads/baked goods.

There is currently only limited scientific data regarding the strength, flexibility, and elastic nature of pulse protein gels. To date, no known protein-based binder has been developed using a pulse protein, and more specifically lentil protein. Canola, algae, sunflower, and potato protein are other protein sources considered not to be common allergenic protein sources and are not known to be used in adhesive binder applications.

As mentioned previously, a successful binder maintains a water activity and a moisture content that are compatible with the agglomerated particles so as to maintain their desired crispiness. Conventionally, binder syrups are produced by heating the syrup to dissolve crystalline sugars, hydrate larger carbohydrates and/or proteins, and reduce moisture content to achieve a target water activity level.

It would be desirable to provide a comestible binder with reduced simple sugar content and increased protein content for granola bars, cereal bars, and clusters with a targeted moisture content and water activity level.

BRIEF DESCRIPTION OF THE INVENTION

Exemplary embodiments are directed to comestible binders having a reduced simple sugar content and an increased protein content.

Exemplary embodiments are directed to comestible binders including a soluble plant protein to increase the protein content in the comestible binder.

Some exemplary embodiments are directed to comestible binders that avoid protein sources considered to be common allergenic protein sources.

Exemplary embodiments employ methods of forming comestible binders having a reduced simple sugar content and an increased protein content, where the comestible binder has a predetermined water activity that is achieved without denaturing the protein.

Among the advantages of certain exemplary embodiments is that a comestible binder has a reduced simple sugar content and an increased protein content without compromising important binder properties found in conventional binders.

Other features and advantages of the present invention will be apparent from the following more detailed description of exemplary embodiments that illustrate, by way of example, the principles of the invention.

In an embodiment, a comestible binder comprising water, glycerol, and about 25% by weight or greater of at least one protein source comprising at least one protein.

In another embodiment, a method of forming a binder includes combining water, glycerol, and about 10% by weight or greater of at least one protein source including at least one protein to form a binder composition. The method also includes removing water at a dehydrating temperature less than a denaturation temperature of the at least one protein to achieve the binder having a predetermined moisture level without denaturing the at least one protein. The binder includes about 25% by weight or greater of the at least one protein source and the at least one protein is not in a denatured state in the binder.

In another embodiment, a comestible product includes a plurality of inclusions and a binder holding the plurality of inclusions together in the comestible product. The binder includes water, glycerol, and about 25% by weight or greater of at least one protein source including at least one protein.

BRIEF DESCRIPTION OF THE DRAWINGS

Wherever possible, the same reference numbers will be used throughout the drawings to represent the same parts.

DETAILED DESCRIPTION OF EXEMPLARY EMBODIMENTS

Figure 1:
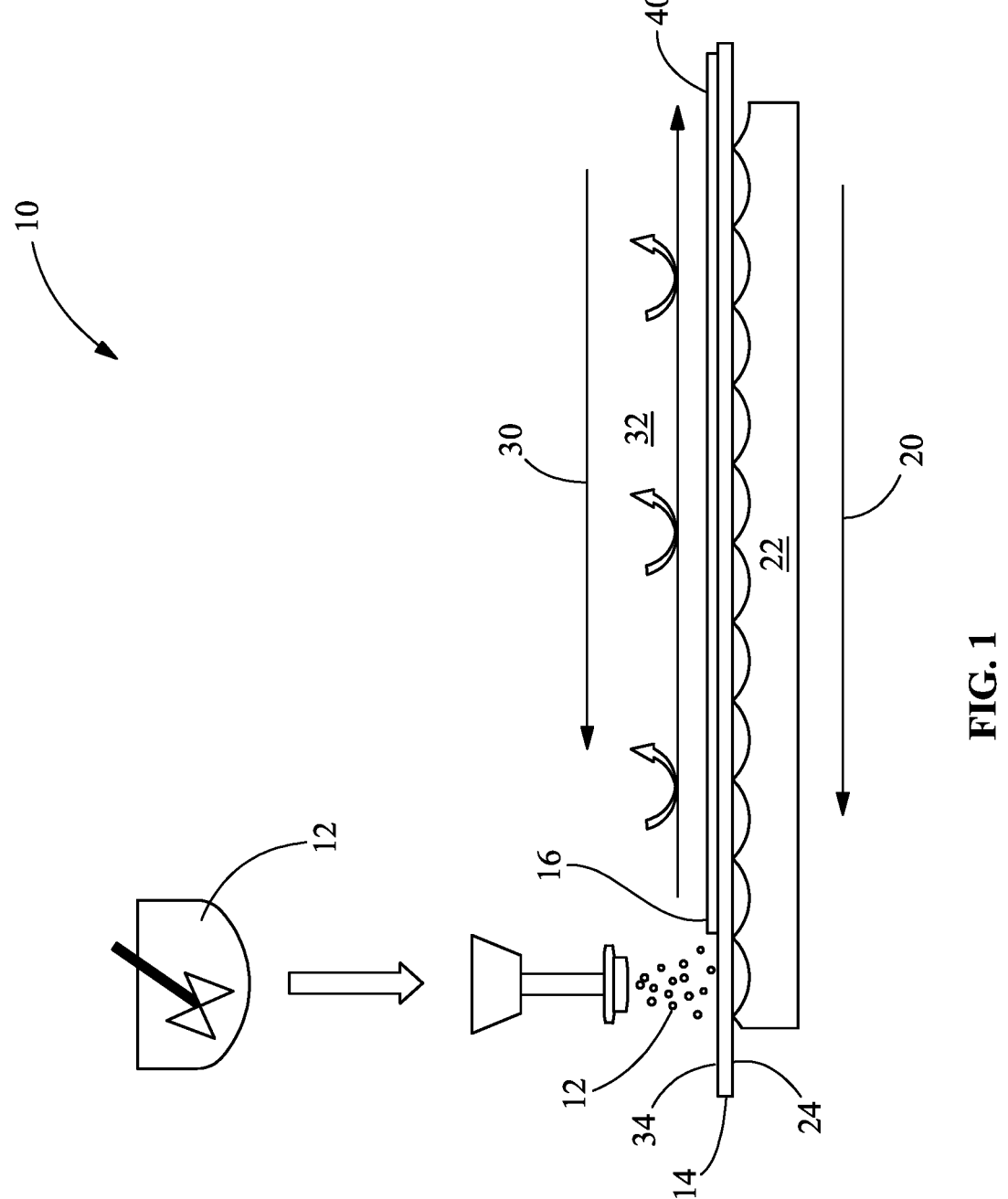
FIG. 1 shows a refractive window drying apparatus and process in an embodiment of the present disclosure.

Use of one or more of certain soluble plant proteins enabled development of higher protein, lower sugar binders for binding of inclusions, such as cereal or granola.

A binder composition includes water, glycerol, and at least one protein source. In some embodiments, the protein source is a soluble plant protein source. In some embodiments, the protein source is a protein source selected from outside the group of common allergenic protein sources. In some embodiments, the binder composition is an emulsion. In some embodiments, at least a portion of the water is removed from the binder composition to achieve a comestible binder having a predetermined water activity without heating the comestible binder, and hence the protein source, above the protein source's denaturation temperature. In some embodiments, the water is removed under a reduced pressure or vacuum. In some embodiments, the water is removed in a refractive window dryer.

In some embodiments, the binder composition further includes at least one fat. The inclusion of a fat permits a reduction in the amount of glycerol in the comestible binder. In some embodiments, the fat is an oil. In some embodiments, the fat is a liquid at room temperature. In other embodiments, the fat is a solid at room temperature. The fat may include, but is not limited to, sunflower oil, coconut oil, shea oil, palm oil, palm kernel oil, olive oil, canola oil, or combinations thereof.

Although protein is the most predominant component in the protein source, the protein source may also include fat, minerals, salts, sugars, and/or water, depending on the protein source. In some embodiments, the protein source is a protein concentrate of about 80% or more protein by weight. In some embodiments, the protein source is a protein isolate of about 90% or more protein by weight.

The protein source may include, but is not limited to, pulse protein, lentil protein, chickpea protein, potato protein, rapeseed protein, sunflower protein, algae protein, whey or other milk protein, or combinations thereof. The protein preferably has an average molecular weight that enables the protein to form a non-opaque binder composition. In some embodiments, the protein has an average molecular weight of about 35 kDa or less. In some embodiments, the average molecular weight of the protein is in the range of about 3 kDa to about 35 kDa, alternatively in the range of about 3 kDa to about 10 kDa, alternatively in the range of about 25 kDa to about 35 kDa, alternatively in the range of about 10 kDa to about 25 kDa, or any value, range, or sub-range therebetween.

The amount of protein in the binder composition is in the range of about 10% to about 25% by weight. When the water is to be removed under reduced pressure, the amount of protein in the binder composition is preferably toward the higher end of the range. When the water is to be removed by refractive window drying, the amount of protein in the binder composition is preferably toward the lower end of the range. The amount of protein in the comestible binder after moisture removal is about 25% or greater by weight, alternatively in the range of about 27% to about 33% by weight, alternatively in the range of about 32% to about 33% by weight, or any value, range, or sub-range therebetween. In some embodiments, the ratio of protein to glycerol in the comestible binder is in the range of 1:1.3 to 1:0.9. In some embodiments, the ratio of protein to fat in the comestible binder is in the range of 1:0.5 to 1:0. In some embodiments, the ratio of protein to oil in the comestible binder is in the range of 1:0.5 to 1:0.

In exemplary embodiments, the binder composition includes, by weight, of the protein source of about 10% or greater, about 10% to about 25%, about 10% to about 15%, about 15% or greater, about 15% to about 20%, about 15% to about 30%, about 20% or greater, about 20% to about 25%, about 25% or greater, or any value, range, or sub-range therebetween; by weight, of glycerin of about 35% or less, about 16% to about 35%, about 20% to about 30%, about 30% or less, about 25% or less, about 16% to about 25%, about 20% or less, about 16% to about 20%, or any value, range, or sub-range therebetween; by weight, of added fat of about 12% or less, about 5% to about 12%, about 8% to about 12%, about 8% or less, about 5% or less, about 5% to about 8%, or any value, range, or sub-range therebetween; and by weight, of water of about 66% or less, about 25% to about 66%, about 50% to about 66%, about 50% or less, about 25% to about 50%, about 33% or less, or any value, range, or sub-range therebetween.

In exemplary embodiments, the binder includes, by weight, of the protein source of about 25% or greater, about 25% to about 33%, about 30% to about 33%, about 30% or greater, about 25% to about 30%, or any value, range, or sub-range therebetween; by weight, of glycerin of about 35% or less, about 18% to about 35%, about 20% to about 30%, about 30% or less, about 25% or less, about 18% to about 25%, about 20% or less, or any value, range, or sub-range therebetween; and by weight, of added fat of about 15% or less, about 10% to about 15%, about 10% or less, about 5% to about 10%, about 5% or less, about 2% or less, or any value, range, or sub-range therebetween.

The comestible binder may optionally include one or more additives. Additives may include, but are not limited to, salt, pectin, flavoring, fiber, oligosaccharides, hydrolyzed protein, alcohol, anti-foaming agents, one or more hydrocolloids, which may include, but are not limited to, xanthan gum, guar gum, locust bean gum, gum acacia, or carrageenan, or combinations thereof.

In some embodiments, the comestible binder includes an amount of simple sugars well below that found in conventional binders. In some embodiments, a small amount of simple sugars is included in the comestible binder, which may permit usage of less glycerol than would otherwise be included in the binder to achieve a given target water activity. In some embodiments, the comestible binder is free or substantially free of simple sugars. As used herein, "substantially free of simple sugars" refers to the comestible binder including no more than about 1% simple sugars, by weight, excluding any simple sugars from the protein source, and no more than about 2% simple sugars, by weight, including any simple sugars from the protein source.

The comestible binder may be combined with an inclusion composition to form a comestible product, where the comestible binder binds the solid pieces of the inclusion composition to each other. Inclusion ingredients may include, but are not limited to, cereal, seeds, nuts, grains, legumes, dehydrated fruits, dehydrated vegetables, jerky, extruded cereal products, extruded protein products, or combinations thereof.

In some embodiments, a process includes heating a binder composition to a temperature that is above ambient or room temperature but below the denaturation temperature of the protein in the binder composition to remove water from the binder composition until a binder with a predetermined water activity is achieved. In some embodiments, the process is a batch process. In some embodiments, the process is a continuous process. In some embodiments, the process further includes mixing the binder with a plurality of inclusions and baking the mixture to form a comestible product.

In some embodiments, the heating of the binder composition to remove water is performed while applying a reduced pressure to the binder composition. In some embodiments, the process further includes stirring the binder composition while heating and applying a reduced pressure.

During development of a reduced sugar binder by replacement of simple sugars with proteins, it was unexpectedly found that in order to maintain a degree of extensional viscosity in a comestible product at high protein levels in the binder, the protein should be plasticized and have minimal denaturation. Consequently, a new processing method for the production of a higher protein, lower sugar binder was developed.

To achieve a targeted water activity level, a vacuum or reduced pressure, which operated at a vacuum temperature below the protein denaturation temperature, was employed to reduce moisture content. In some embodiments, the reduced pressure is about 28 inches of mercury vacuum (−0.95 bar or 48 Torr). In some embodiments, the reduced pressure is at least 28 inches of mercury vacuum (−0.95 bar or 48 Torr). In other embodiments, the reduced pressure may be less than 28 inches of mercury vacuum (−0.95 bar or 48 Torr).

The comestible binder preferably has a water activity of less than about 0.60 and a water content of less than about 15%, by weight, after removal of water under vacuum. In some embodiments, the water content in the comestible binder is in the range of about 10% to about 15% by weight, after removal of water under vacuum to achieve a target predetermined water activity, such as about 10% by weight, about 11% by weight, about 12% by weight, about 13% by weight, about 14% by weight, about 15% by weight or any value, range, or sub-range therebetween. In some embodiments, the water activity is in the range of about 0.30 to about 0.60, alternatively in the range of about 0.30 to about 0.50, alternatively in the range of about 0.35 to about 0.40, or any value, range, or sub-range therebetween.

In some embodiments, the heating of the binder composition to remove water is performed by a refractive window drying technique. The refractive window drying permits a greater variety of protein sources to be used in a binder composition. In some embodiments, the heating occurs without the use of a reduced pressure or vacuum. In some embodiments, the comestible product is formed without baking after combining the binder and the inclusions.

Referring to FIG. 1, when the water is removed by a refractive window dryer 10, the method includes mixing a binder composition 12 including water, glycerol, and about 1% by weight or greater, such as about 5% by weight or greater, such as about 10% by weight or greater, of at least one protein to form and maintain a binder composition as an emulsion during processing. The method also includes applying the binder composition 12 to the belt 14 of the refractive window dryer 10 to form a film 16 of the binder composition on the belt. In some embodiments, the film 16 is an ultra-thin layer. The thinner the binder layer, the faster the drying rate potential is. The method preferably also includes applying a light vacuum to the binder composition 12 prior to applying the binder composition 12 to the belt 14 to remove air in the binder composition 12 and to reduce or prevent foaming of the binder composition 12 on the belt 14, although it will be appreciated that anti-foaming agents may also be added.

The method further includes conveying the film 16 of binder composition on the belt 14 through the refractive window dryer 10 while applying a circulating flow 20 of heated water 22 to the lower surface 24 of the belt and applying a circulating flow 30 of gas 32 to the film 16 and upper surface 34 of the belt 14. The temperature of the circulating heated water 22 is selected to maintain the protein in the binder composition 12 at a temperature below the denaturation temperature of the protein. The circulating flow 30 of gas 32 may be any desired flow, but in some embodiments is a cross-flow or counter-current flow.

In exemplary embodiments, the binder composition 12 has a water activity in the range of 0.72 to 1.0, alternatively about 0.90 to 0.99, such as 0.97, at a temperature of about 4° C. (40° F.) when applied to the belt 14. In exemplary embodiments, the belt temperature, belt speed, and ambient air conditions are selected to obtain a binder 40 output with a target water activity. In some embodiments, the binder 40 exits the refractive window dryer 10 and leaves the belt 14 after about six minutes with a water activity of about 0.53 at a temperature of 50° C. (122° F.) or a water activity of about 0.43 at a temperature of 70° C. (158° F.). In some embodiments, the binder 40 leaving the belt has a predetermined viscosity. Preferably, the binder leaving the belt has a zero shear viscosity of less than 460 Pas at 50° C.

In some embodiments, the denaturation temperature for the protein is about 140° F. (about 60° C.). The denaturation temperature for some fractions of potato protein is about 140° F. (about 60° C.). When potato protein is the protein source, the belt temperature is preferably below 140° F. (60° C.).

In some embodiments, the denaturation temperature for the protein is in the range of about 149° F. (about 68° C.) to about 158° F. (about 70° C.). The denaturation temperature for some fractions of whey protein is in the range of about 149° F. (about 68° C.) to about 158° F. (about 70° C.). When whey protein is the protein source, the belt temperature is preferably below about 149° F. (about 68° C.) to about 158° F. (about 70° C.).

EXAMPLES

The invention is further described in the context of the following examples which are presented by way of illustration, not of limitation. Although the following examples were benchtop-scale batch processes, the principles described herein may be applied to batch or continuous processes on a benchtop scale or a large production scale.

Inclusion Composition.

An inclusion composition to be combined with a binder composition to form a comestible product included whole almonds, pumpkin seeds, brown rice, rolled oats, cranberries, and dried blueberries.

Comparative Example

A comparative example (CE) was made by combining a conventional binder containing simple sugars with the inclusion composition.

The conventional binder was mixed in a mixer with components of the inclusion composition in the following steps to form a homogeneous mixture. The conventional binder was first mixed in the mixer. The inclusion ingredients, except for the cranberries and blueberries, were then added to the mixer and mixed with the conventional binder in one step until homogeneous. The berries were added to the mixer last and mixed in until homogeneous. The whole mixing process took about 5 minutes. The agitation was not stopped at any time during this process to avoid jamming the equipment. The homogeneous mixture of the comparative example was immediately transferred for cutting and shaping into CE bars.

Inventive Example 1

A first inventive example (IE1) binder was made by first weighing and combining sunflower oil, water, and glycerol in the amounts shown in Table 1 in a mixer bowl by blending for one minute at a setting of speed 1. The potato protein, which was the protein source, and salt were then added and blended into the mixture on a setting of speed 1 until a homogeneous mixture was achieved. Mixing continued at a blender setting of speed 1 under vacuum for about an hour until a target water activity of about 0.4 was achieved. The mixture was then removed from vacuum and heated to about 113° F. (about 45° C.) while blending at a setting of speed 1. The flavoring was added and blended into the mixture to form the IE1 binder, which was stored overnight at about 110° F. (about 43° C.) until use.

The IE1 binder was mixed in a mixer with components of the inclusion composition in the following steps to form a homogeneous mixture. About half of the inclusion ingredients, including the berries, were placed in the mixer first and thoroughly mixed for about 10 minutes. The sugars in the berries helped to keep the pieces from forming clumps when the IE1 binder was then added to the mixer and mixed with the first half of the inclusion ingredients.

TABLE 1

| Inventive Example 1 Ingredients | |
| --- | --- |
| Ingredient | wt % |
| Sunflower oil (high oleic, Trisun AS 100) | 11.49 |
| Water | 25.45 |
| Potato protein (Solanic 300) | 27.36 |
| Glycerol (99.7% USP, kosher) | 34.75 |
| Salt (flour, fine) | 0.70 |
| Flavoring | 0.25 |

The remainder of the inclusion ingredients was then added and allowed to mix for an additional 10 minutes, the whole process taking approximately 20 minutes. The homogeneous mixture was immediately transferred for cutting and shaping into IE1 bars. The IE1 bar composition was stickier than the CE bar.

Some IE1 bars were baked to determine the effect of such a heat treatment on the binder strength and other properties. The baking included heating an IE1 bar in a benchtop convection oven set at about 150° F. (about 66° C.) and a fan speed of 1 for about 4.5 minutes until an internal temperature of about 140° F. (about 60° C.) was reached to form a baked first inventive example (BIE1) bar.

Inventive Example 2

A second inventive example (IE2) binder was made by first weighing and combining the sunflower oil, water, and glycerol in the amounts in Table 2 in the bowl of a mixer by blending for one minute at a setting of speed 1. The pectin, potato protein, which was the protein source, and salt were then added and blended into the mixture on a setting of speed 1 until a homogeneous mixture was achieved. Mixing continued at a blender setting of speed 1 under vacuum for about an hour until a target water activity of about 0.4 was achieved. The mixture was then removed from vacuum and heated to about 113° F. (about 45° C.) while blending at a setting of speed 1. The flavoring was added and blended into the mixture to form the IE2 binder, which was stored overnight at about 110° F. (about 43° C.) until use.

TABLE 2

| Inventive Example 2 Ingredients | |
| --- | --- |
| Ingredient | wt % |
| Pectin | 0.36 |
| Sunflower oil (high oleic, Trisun AS 100) | 11.45 |
| Water | 25.35 |
| Potato protein (Solanic 300) | 27.26 |
| Glycerol (99.7% USP, kosher) | 34.63 |
| Salt (flour, fine) | 0.70 |
| Flavoring | 0.25 |

The IE2 binder was combined with the inclusion composition in the same manner as the IE1 binder. The homogeneous mixture was immediately transferred for cutting and shaping into IE2 bars. The IE2 bar composition was stickier than both the IE1 bar and the CE bar.

Some IE2 bars were baked to determine the effect of such a heat treatment on the binder strength and other properties. The baking included heating an IE2 bar in a benchtop convection oven set at about 150° F. (about 66° C.) and a fan speed of 1 for about 4.5 minutes until an internal temperature of about 140° F. (about 60° C.) was reached to form a baked second inventive example (BIE2) bar.

Experimental Testing

CE bars of inclusion mixtures with CE binder, IE1 bars of inclusion mixtures with IE1 binder, and IE2 bars of inclusion mixtures with IE2 binder were comparatively tested for textural properties.

During tension testing, a ductile failure was observed for all three bar types consistent with a chewy texture. After failure, however, the CE bar showed good extensional viscosity, whereas the IE1 bar and the IE2 bar did not. Although the importance of extensional viscosity is somewhat subjective, a higher extensional viscosity tends to mean that the bar is stringier when pulled apart. Increasing the water activity level of the binder tends to increase the extensional viscosity. Based on the observations from this experimental testing, however, when the water activity is the same, the IE1 bar and the IE2 bar have a lower extensional viscosity than the CE bar.

Rheological work has shown that a potato protein binder with no pectin, such as the IE1 binder, cold flows over time, whereas a potato protein binder with pectin, such as the IE2 binder, does not. A heat treatment of the IE1 binder above about 122° F. (about 50° C.) was expected to heat-set the binder and prevent cold flow. Therefore, the impact of a heat treatment post shape, cool, and cut was determined.

Figure 2:
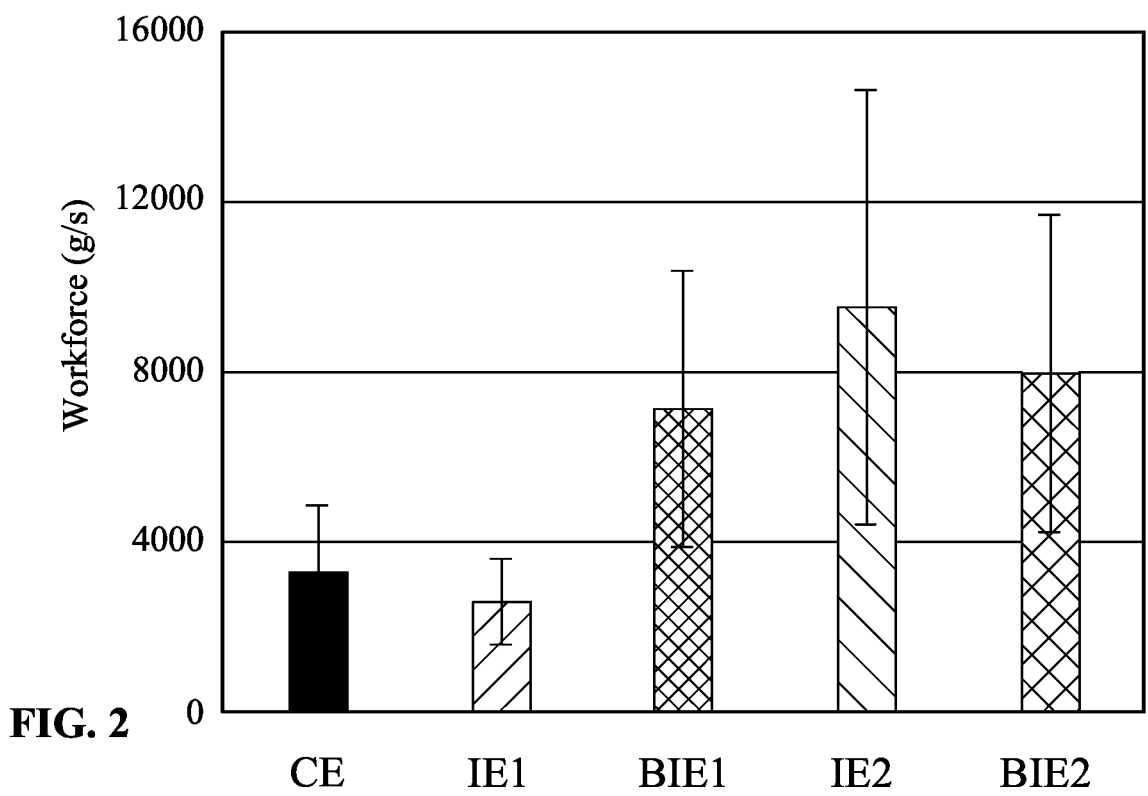
FIG. 2 shows the work force in tension to pull apart bars held together by binder.

The relative binder strength of a binder in a bar with inclusions was gauged by measuring the total work force required to pull a bar apart. Referring to FIG. 2, the binder strength of the IE1 binder was similar to the CE binder. Baking the IE1 bar increased the binder strength in a BIE1 bar. The addition of pectin to form the IE2 binder also increased binder strength even more so than the addition of pectin. Baking the IE2 bar slightly decreased the binder strength of a BIE2 to a similar level as the BIE1 bar.

Figure 3:
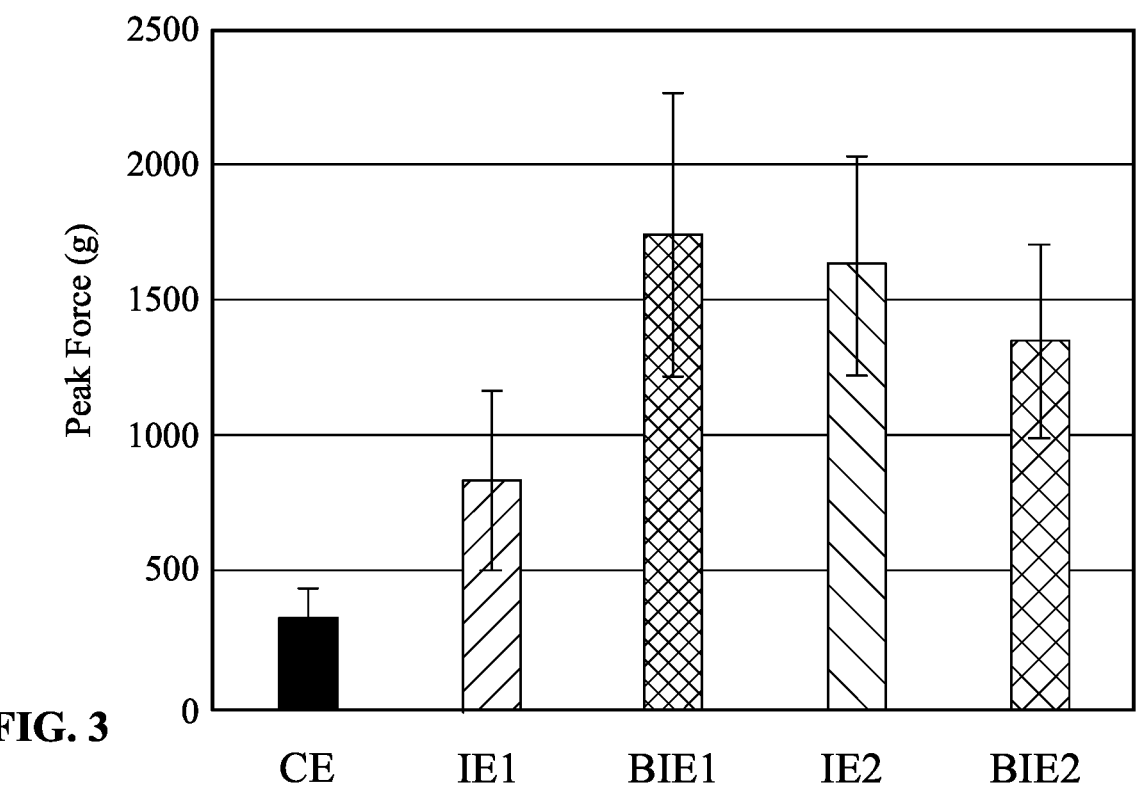
FIG. 3 shows the peak force measured in tension while pulling apart bars held together by binder.

Referring to FIG. 3, the peak force required for failure in tension did not follow the same trend as that for total work force. The binder of the IE1 bar had a greater peak force than the binder of the CE bar but not as high as that of the binder of the IE2 bar. The heat treatment increased the peak force in the binder of the resulting BIE1 bar but reduced the peak force in the binder of the resulting BIE2 bar.

Figure 4:
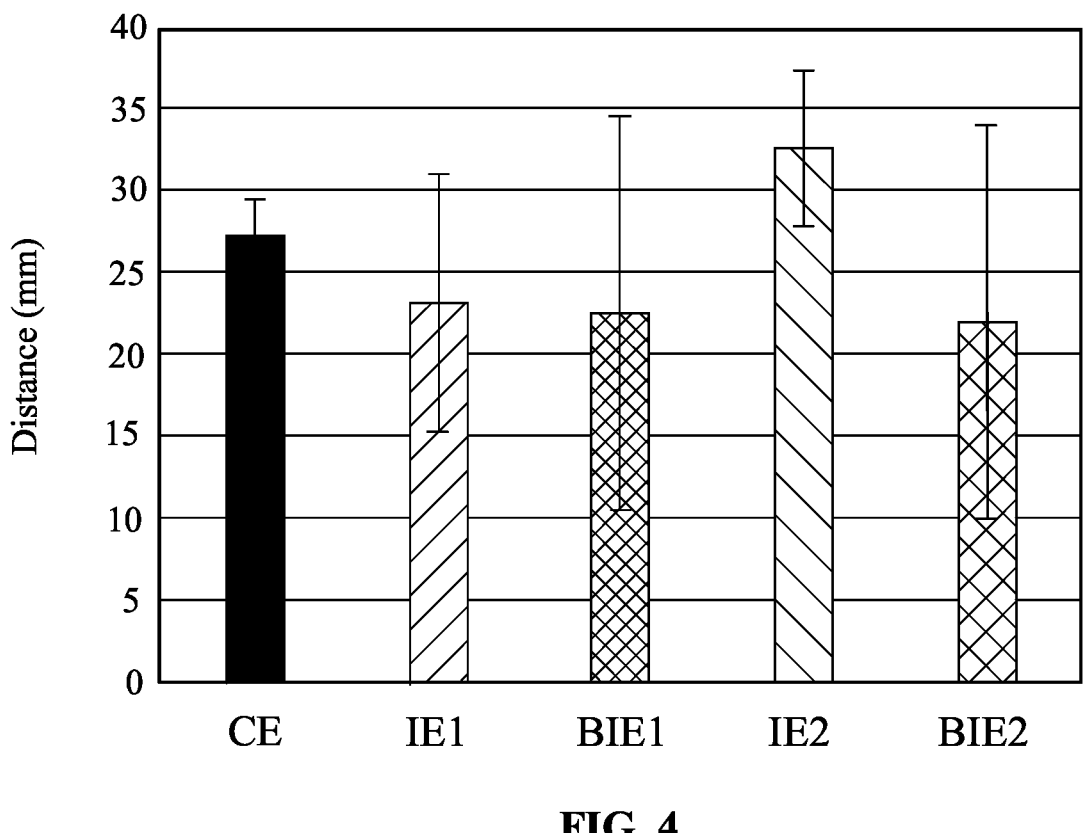
FIG. 4 shows the distance that the bars are pulled in tension before coming apart.

Further, referring to FIG. 4, the distance at which the tension deformation curve was complete, which was the distance at which the two ends of the bar completely separated in tension, was greatest for the IE2 binder, while all other binder conditions were similar to each other. This suggests that the pectin provides a slightly greater stretch than other treatments, which is lost upon heat treatment.

The water activity of a binder also influences other material properties, such as strength. Although the target water activity of the CE binder, the IE1 binder, and the IE2 binder was about 0.4, different batches of the IE1 binder and the IE2 binder were measured as having a water activity from as low as about 0.33 up to about 0.4. Certain batches of the IE1 binder were combined, as were certain batches of the IE2 binder, and the IE1 binder and IE2 binder that were used to form bars each had a water activity of about 0.35. An IE1 binder and an IE2 binder with a water activity of 0.4 would be expected to have a reduced firmness compared to what was actually observed in the results discussed above with a water activity of about 0.35.

A lower water activity may be achieved for a potato protein binder while maintaining a strength similar to a comparative binder that is at a higher water activity level. This means that a potato protein binder may maintain the crispiness of the inclusion components better than some other binders. A potato protein binder including pectin, however, was stronger. The binder strength of the potato protein binder may be reduced by increasing the water activity to 0.4 to give a bar strength more similar to that of the comparative binder.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A comestible binder comprising water, glycerol, and at least one protein source comprising protein, wherein the glycerol is about 18% to about 35% by weight of the comestible binder, wherein the protein is at least 25% by weight of the comestible binder, wherein the at least one protein source is selected from the group consisting of a pulse protein source, a lentil protein source, a chickpea protein source, a potato protein source, a rapeseed protein source, a sunflower protein source, an algae protein source, and combinations thereof, and wherein the protein is not in a denatured state in the comestible binder.

2. The comestible binder of claim 1, wherein the comestible binder has a water activity in the range of about 0.30 to about 0.60.

3. The comestible binder of claim 1, wherein the comestible binder has a water activity in the range of about 0.35 to about 0.40.

4. The comestible binder of claim 1 further comprising at least one additive.

5. A comestible product comprising:
   a plurality of inclusions; and
   a binder holding the plurality of inclusions together in the comestible product, the binder comprising:
      water;
      glycerol; and
      at least one protein source comprising protein, wherein the glycerol is about 18% to about 35% by weight of the comestible binder, wherein the protein is at least 25% by weight of the comestible binder, wherein the at least one protein source is selected from the group consisting of a pulse protein source, a lentil protein source, a chickpea protein source, a potato protein source, a rapeseed protein source, a sunflower protein source, an algae protein source, and combinations thereof, and wherein the protein is not in a denatured state in the comestible binder.

6. The comestible product of claim 5, wherein the binder has a water activity in the range of about 0.30 to about 0.60.

7. The comestible product of claim 5, wherein the binder has a water activity in the range of about 0.35 to about 0.40.

8. The comestible product of claim 5, wherein the at least one protein source includes a potato protein source.

9. The comestible product of claim 5, wherein the binder further comprises at least one additive.

10. The comestible product of claim 5, wherein the plurality of inclusions comprise solid foods selected from the group consisting of cereal, seeds, nuts, grains, legumes, fruits, and combinations thereof.

11. The comestible binder of claim 1, wherein the at least one protein source includes a potato protein source.

12. The comestible product of claim 5, wherein the protein and the glycerol are at a ratio of 1:0.9 to 1:1.3 by weight in the comestible binder.

13. The comestible binder of claim 1, wherein the protein and the glycerol are at a ratio of 1:0.9 to 1:1.3 by weight in the comestible binder.

14. The comestible binder of claim 1, wherein the protein source is a protein concentrate of 80% or more of protein, by weight.

15. The comestible binder of claim 1, wherein the protein source is a protein isolate of 90% or more of protein, by weight.

16. The comestible product of claim 5, wherein the protein source is a protein concentrate of 80% or more of protein, by weight.

17. The comestible product of claim 5, wherein the protein source is a protein isolate of 90% or more of protein, by weight.

5

* * * * *